United States Patent
Fedon et al.

(10) Patent No.: US 9,890,078 B2
(45) Date of Patent: Feb. 13, 2018

(54) PLANT AND METHOD FOR THE STABILIZATION AND INERTIZATION OF SLAG DERIVING FROM STEEL PRODUCTION PROCESSES IN STEELWORKS AND BLAST FURNACES

(71) Applicants: Marco Fedon, Belluno (IT); Pierpaolo Michieletto, Scorze' (IT); Renato Pilotto, Belluno (IT)

(72) Inventors: Marco Fedon, Belluno (IT); Pierpaolo Michieletto, Scorze' (IT); Renato Pilotto, Belluno (IT)

(73) Assignee: FMP S.N.C. DI FEDON MARCO E MICHIELETTO, Torsa di Pocenia (UD) (IT)

( * ) Notice: Subject to any disclaimer, the term of this patent is extended or adjusted under 35 U.S.C. 154(b) by 192 days.

(21) Appl. No.: 14/891,433

(22) PCT Filed: May 15, 2014

(86) PCT No.: PCT/EP2014/001311
§ 371 (c)(1),
(2) Date: Nov. 16, 2015

(87) PCT Pub. No.: WO2014/183876
PCT Pub. Date: Nov. 20, 2014

(65) Prior Publication Data
US 2016/0122242 A1  May 5, 2016

(30) Foreign Application Priority Data
May 17, 2013  (IT) ............................. BL2013A0009

(51) Int. Cl.
*C04B 5/00* (2006.01)
*C04B 18/14* (2006.01)
*B01F 3/20* (2006.01)
*C04B 18/06* (2006.01)
*C04B 28/02* (2006.01)
*C04B 40/00* (2006.01)

(52) U.S. Cl.
CPC .............. *C04B 5/00* (2013.01); *B01F 3/2071* (2013.01); *C04B 18/067* (2013.01); *C04B 18/142* (2013.01); *C04B 28/02* (2013.01); *C04B 40/0028* (2013.01); *Y02W 30/94* (2015.05)

(58) Field of Classification Search
CPC ....... C04B 5/00; C04B 18/142; C04B 18/067; C04B 20/1077; C04B 28/02; C04B 40/0028; B01F 3/2071
See application file for complete search history.

(56) References Cited

U.S. PATENT DOCUMENTS 3,717,490 A    2/1973  Hauser

FOREIGN PATENT DOCUMENTS

| FR | 1357032 A | 4/1964 |
| FR | 2742431 A1 | 6/1997 |
| GB | 18806 A | 0/1914 |
| GB | 1209296 A | 10/1970 |
| GB | 2327669 A | 2/1999 |

OTHER PUBLICATIONS

International Search Report for corresponding International Application No. PCT/EP2014/001311, [2014].

*Primary Examiner* — Anthony J Green
(74) *Attorney, Agent, or Firm* — Egbert Law Offices, PLLC

(57) ABSTRACT

Method and plant for the stabilization and inertization of slag which is intended to obtain an inert and matured product based on slag deriving from steel production processes in steelworks or ferrous mineral treatment processes in blast furnaces.

14 Claims, 2 Drawing Sheets

PLANT AND METHOD FOR THE STABILIZATION AND INERTIZATION OF SLAG DERIVING FROM STEEL PRODUCTION PROCESSES IN STEELWORKS AND BLAST FURNACES

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates to a treatment method of slags deriving from steel production processes in steelworks and blast furnaces according to the characteristics of the pre-characterizing part of claim 1.

The present invention also relates to a plant for the stabilization and inertization of slag which is intended to obtain an inert and matured product based on slag deriving from steel-production processes in steelworks or ferrous mineral treatment processes in blast furnaces according to the characteristics of the pre-characterizing part of claim 15.

The present invention also relates to an inert and matured product based on slag deriving from steel production processes in steelworks or ferrous mineral treatment processes in blast furnaces characterised according to the characteristics of the pre-characterizing part of claim 16.

Definitions

In this description and in the appended claims the following terms must be intended according to the definitions given in the following.

During the present description by the term "hydraulic binder" it is intended to indicate an inorganic component that, following the mixing with a set water quantity is subject to a hydrating process that causes some chemical reactions between the water and silicates, aluminates, both amorphous and crystalline calcium aluminates and or sulpho aluminates, calcium ferrites. The chemical reactions bring to the formation of insoluble or poorly soluble hydrates forming a dough that hardens after a hardening period. For example gypsum, lime, hydraulic lime, clinker, a mixture of clinker and gypsum, the cement agglomerates and the cements. are hydraulic binders.

2. Description of Related Art Including Information Disclosed Under 37 CFR 1.97 and 37 CFR 1.98

In the steel production processes in steelworks or ferrous mineral treatment processes in blast furnaces, a certain quantity of slag as discard product is obtained, which must be adequately disposed. While once the slags were considered a discard material and were accumulated in bunkers outdoor or sent to dump, also due to new regulations on the disposal and following raising production costs, today such slags are no longer considered as discards but as a by-product for whose reuse a new way was found, with the aim to reach the objective of having no discard product to minimize the effects on the environment of the steel production process, to reduce the disposal costs and, therefore, to reduce the total production costs.

Since a long time some attempts to reutilize in building field the slags deriving from the steel production processes in steelworks or ferrous mineral treatment processes in blast furnaces have been carried out.

Particular problems are related to the potential risk that the slags or the products obtained from them may release heavy metal ions in the environment, which are considered as polluting materials.

Among the prior art techniques WO 2011/101386 describes a specific low-weight cellular concrete that includes cement, water, a water reduction agent, a foaming agent, a soluble calcium salt, inorganic particles having sizes from 0.1 to 300 micron among which may be present slags, in which the relation between foaming agent and calcium salt is between 0.3 and 0.8.

The U.S. Pat. No. 5,037,286 describes an apparatus for treating of incinerates from a refuse incineration plant to obtain ash balls coated by a cement composition for their following disposal in dump.

The Patent Application GB2327669 describes a material in the form of particles, intended to the use in the building of airport and road surfaces, comprising aggregate particles coated with a cement and water mixture, in which the particles can comprise either crushed or non-crushed aggregates, aggregates deriving from recycling or artificial aggregates. The coated particles are rougher with respect to the non-coated aggregates. Preferably the particles to be coated are natural non-crushed aggregates e.g. gravel that is smooth and rounded. To the cement can be added lime, micro siliceous materials, hardening accelerators, super-fluidifying materials. Further materials in the form of smaller particles can be enclosed in the coating, some of whose particles protrude from the coating surface. The material in the form of particles is made by mixing aggregate particles with cement, water and possibly additives, separating the particles by passage through vibrating or rotating sieves before the hardening of the cement, and then transferring the separated particles on a vibration conveyor up to when the cement reaches substantially its hardening degree.

The Patent Application FR1357032 describes a treatment process of granulated slags for use in grouts and concretes, the process providing the coating of the granules of slags with a cement film that does not show incompatibility with the binder of granules and concretes in the composition in which the slag must be introduced. The process provides the mixing of the wet granulated slag with the cement, the proportion of the cement being a small percentage in weight with respect to the weight of the slag and the water present in the slag being sufficient for the formation of the cement dough to cover the granules of slags with the film.

The Patent Application FR2742431 describes a treatment process of slags deriving from the incinerating of the refuse which are chopped before being mechanically, physically and chemically characterised. Following the characterization of the mechanical, physical and chemical properties of the chopped slags the material is pre-formed to produce a pre-hydrated slag that can then be coated with a hydraulic binder.

Problems of Prior Art

The treatment of slags today is often a considerable problem. For example some slags, just obtained by the steel melting processes at high-temperature, are subject to a fast cooling by means of water jets obtaining slags with glass consistence and with a considerable number of pits on their inside. Such types of slags are considered often a refuse, a discard of the metallurgic production with consequent high costs due to their disposal or anyway to their storing. The physical and mechanical characteristics of the aggregates deriving from the slags of steel production processes in steelworks or ferrous mineral treatment processes in blast furnaces are since a long time an object of interest and various studies both for the big volumes that are produced and for the problem that derives from the storing in areas not adequately equipped with possible consequent release of potentially polluting elements.

In building field the use of the slags is considered unattractive and there are important prejudices on the effectiveness of their use because of the characteristics of the slags that influence their applicability in this field and because of the disadvantages attributed to their use and that are mainly:
1) presence of a structure with pits which involves an anomalous water use during the mixture of the concrete and that makes the use of the slags hardly manageable in yard;
2) presence of heavy metals that are potentially polluting if their release in the environment occurs;
3) high weight of the slag inert products with respect to the inert products from quarry that penalizes the transport of the concrete in the concrete mixer; in fact the inert products deriving from slag can weigh also about 30% more with respect to the inert product from quarry, with the consequence that also the concrete obtained will be heavier, though this disadvantage is inherent only with the maximum volume that can be carried for example by the a concrete mixer because with an equal heavy weight transportable by the concrete mixer, the volume of the transported product will be lower due to the greater specific weight of the product;
4) resistance in the course of time of the manufactured product made with concretes containing slags because of the excessive need of water in the concrete constituting the same product.

With particular reference to the applications in building field, the prior art techniques often find big limitations to the use of the slags deriving from the steel production processes in steelworks or ferrous mineral treatment processes in blast furnaces because of anomalous and hardly predictable and quantifiable phenomena of water absorption. In fact the making of concrete provides the mixing in concrete mixer of inert product from quarry, sand, cement, additives and water. Replacing the inert product from quarry with the one from slag of analogous size a problem during the amalgam phase can be soon noticed. In fact the porous structure of the slag causes an uncontrollable and high absorption of water which is anomalous and discontinuous, with respect to the absorption that occurs in the case of resorting to the usual inert products from quarry.

Furthermore in the phase of concrete curing, the hydrating heat that originates also causes an at least partial evaporation of the exceeding water that is supplied to the mixture. The evaporation causes the formation of minuscule free spaces which successively cause a withdrawal of the product or of the concrete with consequent formation of cracks and breakings at the structural level and drawbacks at physical and visual level that do not allow to have a homogenous concrete or anyway suitable for the specific requirements for example in the case of visible faces, industrial pavements, etc. Further disadvantage of this excessive and anomalous evaporation of water is the possible occurrence of phenomena of "efflorescence" caused from the coming to surface of some physical elements present in the cement. Notwithstanding the grinding of the slag in various sizes, also very fine ones, the above described problem remains and therefore the use in building field is very limited with respect to the one which it could actually be. For applications that require superficial fine qualities of the solidified concrete, namely. in the case of visible faces, industrial pavements, resort is usually made to specific types of concrete e.g. self-compacting concretes known with the abbreviation SCC [Self Compacting Concrete] or self-leveling concretes known with the abbreviation SLC [Self-Levelling Concrete] which are cement conglomerates that are endowed with high fluidity and high resistance to the segregation so that during the deposit eliminate rapidly the presence of possible voids and the exceeding air thus avoiding the formation of macro-defects of the concrete. However such solutions are more expensive.

Though some prior art techniques describe the use of a certain quantity of slags in the preparation of cement products, namely the patent WO 2011/101386, they do not explain how the treatment of the slags themselves for the purpose of making them suitable to be incorporated within the cement mixture must occur, that is the prior art techniques do not explain how an effective inertization of the slags should be performed in order to obtain an inert product successively suitable to be used for example in the preparation of a cement product. Furthermore in the prior art techniques, namely the patent WO 2011/101386, it is foreseen that the possible present slags are reduced to very fine granulometries, of the order of about 0.1-300 micron, which means that the slags must be treated by means of expensive processes and fittings to obtain particularly fine sizes, which increases the application costs of the described technique and also cause that the operators are exposed to the very thin powders obtained by slags deriving from steel production processes in steelworks or working of ferrous mineral treatment processes in blast furnaces, this exposition happening before the slags are effectively treated to be inertized.

Furthermore the inertization that we can obtain from the incorporation of finely crushed slags within cement products is not effective as the cement is not able to inertize effectively the single grains but is limited to incorporate them in the mixture with the risk that in any case the detachment of fine powders from the manufactured product with dispersion of heavy metals in the environment may occur.

For example the solutions described in U.S. Pat. No. 5,037,286; GB2327669; FR1357032; FR2742431 in practice provide that the particles of slags are incorporated or anyway completely coated by the cement, with considerable material waste of material and uncertainty in the effective inertization of the product.

BRIEF SUMMARY OF THE INVENTION

Aim of the Invention

The aim of this invention is to supply a method to obtain an inert product starting from slags deriving from steel production processes in steelworks or ferrous mineral treatment processes in blast furnaces, this inert being easily utilizable for multiple applications among which, without limitation for the purposes of the present invention, use in building field for the realization of concretes, use as abrasive material, use for the realization of road environments, use for the realization of pavements in general.

Concept of the Invention

The aim is reached with the characteristics of the main claim. The sub-claims represent advantageous solutions.

Advantageous Effects of the Invention

The solution according to the present invention, by the considerable creative contribution the effect of which constitutes an immediate and important technical progress, presents various advantages.

First of all by means of the method according to the present invention it is possible an effective exploitation of the slags deriving from the steel production processes in steelworks or ferrous mineral treatment processes in blast furnaces obtaining an inert product that is suitable to multiple uses that are not limited to be applied to the building field of the invention. Consequently by the solution according to the present invention, allowing an effective exploitation of the slags, there are advantages from the point of view of the disposal costs or storing of the same that are effectively reduced if not even zeroed.

Furthermore the use of the inert products obtained according to the method in accordance with the present invention allows to obtain important benefits with respect to the solutions that adopt inert products from quarry namely:
1) high degree of compressive strength in the products or in the floors subjected to loads concentrated or submitted to intensive utilizes with benefits both from the point of view of the frictional resistance by rolling and from the point of view of the mechanical resistance to the repeated passage of heavy means, thanks to the glass consistence and to the composition of the slag;
2) greater resistance of the manufactured products to the chemical etching or aggressive agents in difficult environments thanks to the pozzolana characteristics of the slag, such advantages being for example particularly useful in the execution cases of deposit basins of liquids or for the depuration or for the collection of rainwater waters;
3) resolution of the problem relative to the possible release of heavy metal ions in the environment;
4) possibility to obtain pre-packaged concretes in which a part or the whole inert product from quarry is replaced with the inert product deriving from slag according to the present invention, obtaining high value of the concrete resistance class (Rck) with a minor use of cement and of inert product;
5) Possibility of use of the inert product obtained according to the present invention for different applications namely as abrasive material.

The solution according to the present invention allows to make inert the slags deriving from steel production processes in steelworks or ferrous mineral treatment processes in blast furnaces and to incorporate them in a mixture that can be successively used to obtain different products among which, for example, cement products, abrasive materials, road sub-grades, pavements in general.

Advantageously the treatment process of slags according to the present invention does not provide the reduction of the slags to micrometric powders which may be object of dispersion in the environment and that can expose the operators to the risk of inhaling the same things, but the solution according to the present invention allows to obtain the inertization of the slags without the need to reduce the same to micrometric granulometries.

Advantageously with the solution according to the present invention it is not obtained a product that is univocally intended to a specific application but is obtained an inert material which can be used for different applications. In fact the solution according to the present invention involves the formation of a new inert product deriving from the joining of all types of slag with a hydraulic type binder, so obtaining a new inert product that will have innovative physical characteristics that make it applicable both in the concrete (of any typology and in any applicative field) and in the production of asphalts, road sub-grades and pavements in general, wearing carpets, abrasive materials and in general it is obtained an inert product suitable to be used in all the industrial and civil fields.

BRIEF DESCRIPTION OF THE DRAWINGS

In the following a solution is described with reference to the included drawings to be considered as non-exhaustive example of the present invention in which.

DETAILED DESCRIPTION OF THE INVENTION

The present invention relates to an inertization method which starting from slags deriving from the steel production processes in steelworks or ferrous mineral treatment processes in blast furnaces allows to obtain a stable and inert product by means of manipulation and production of the same slags. In practice the production of the slags according to the method in accordance with the present invention allows to obtain a new inert product typology which can be immediately used or will be also used in a second time with respect to that of production allowing the storing or the packaging for its next use.

Figure 1:
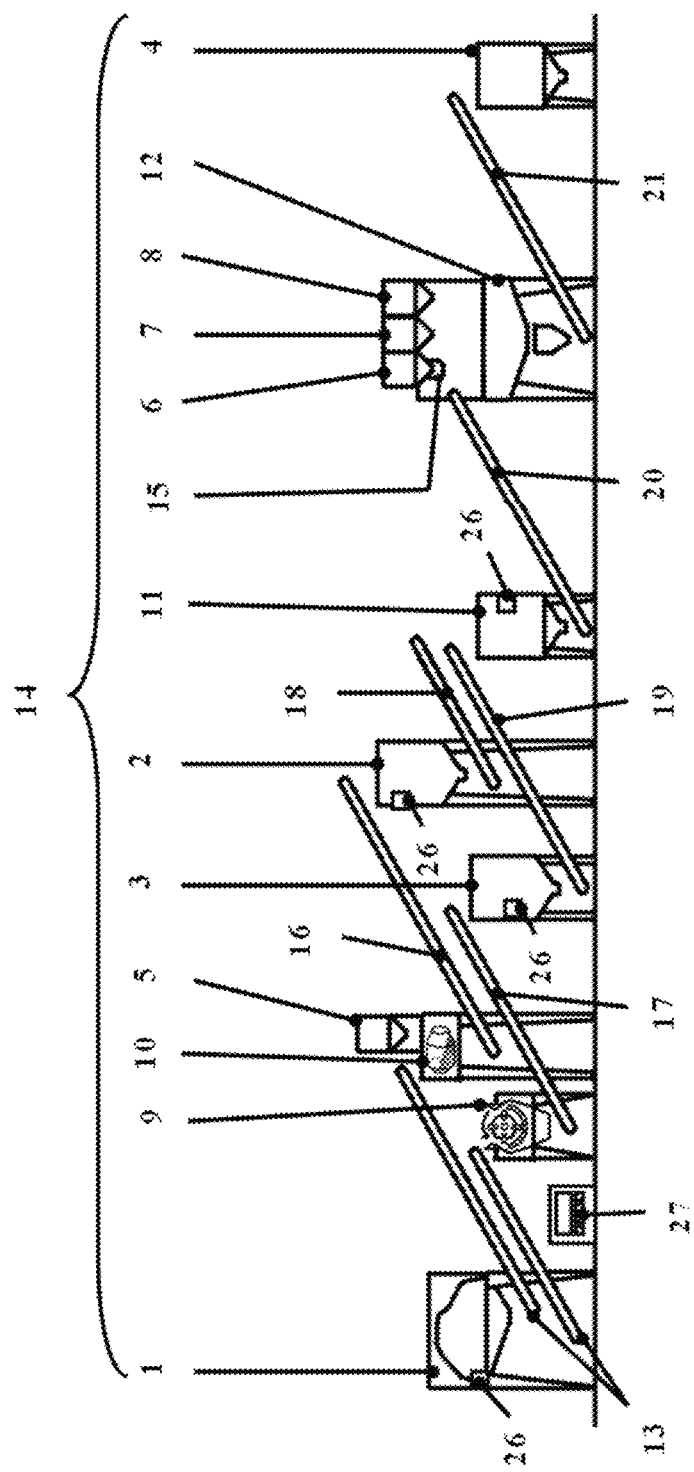
FIG. 1 represents schematically a plant realized in accordance with the present invention for treatment and inertization of slags deriving from the steel production processes in steelworks or ferrous mineral treatment processes in blast furnaces.
Figure 2:
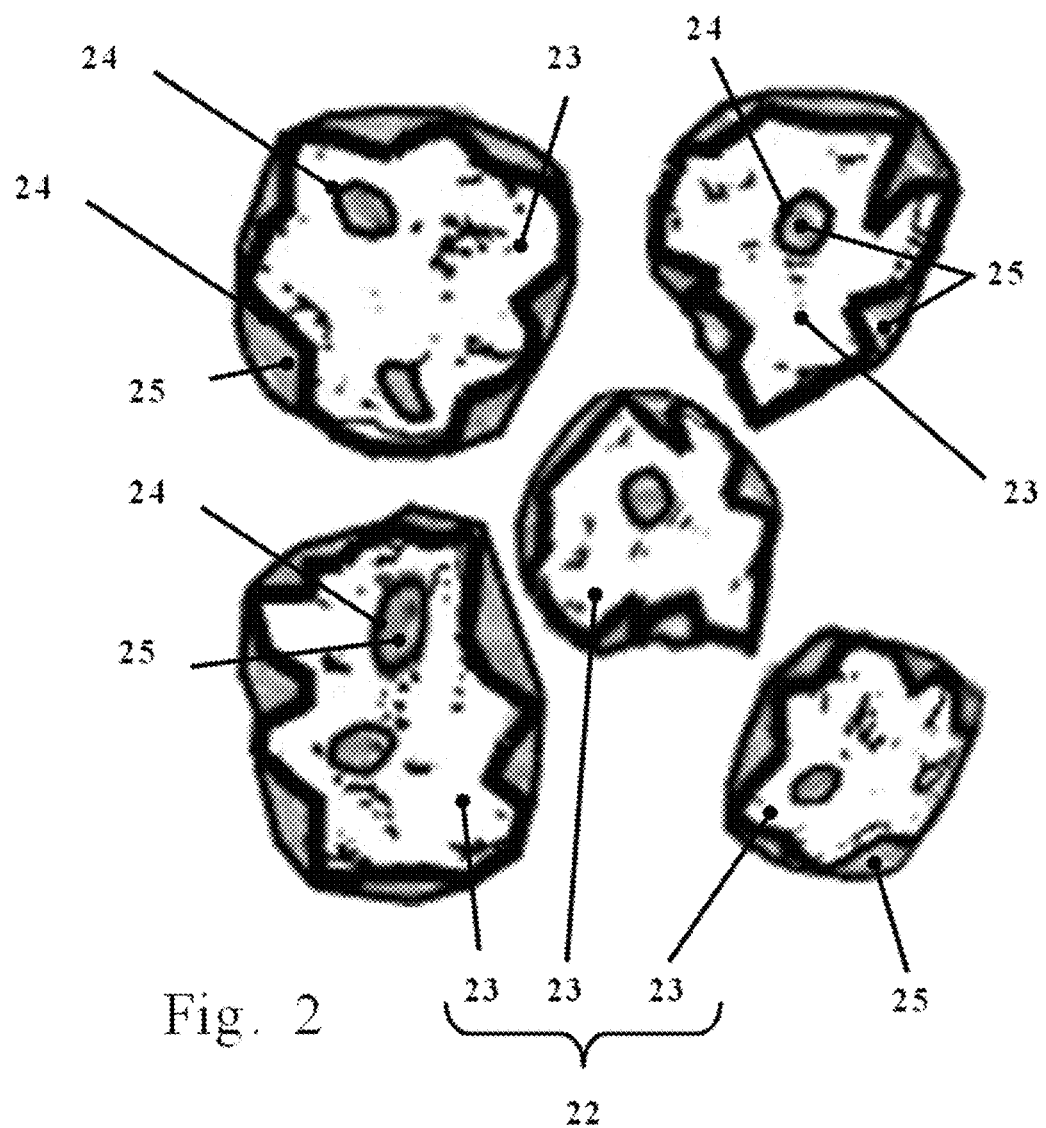
FIG. 2 represents schematically the granulated material obtained by means of the present invention.

By means of the inventive method a product is obtained in which the porous pits of the molecular structure of the slags are filled in a definitive way so that the heavy metal ions and other possible potentially polluting elements contained in the slags are not subjected to dispersion in the environment when in contact with water or other substances possibly also aggressive ones, but are effectively coated and restrained by the binder used in the inventive method. In the case of chemically aggressive substances the absence of dispersion in the environment of heavy metal ions is due to the incorporation and filling action (FIG. 2) of the pits or pores (24) of the grains (23) that form the granulated material (22), this incorporation occurring by means of the binder (25).

In practice, contrarily to the prior art techniques, an incorporation of the slag particles within a cement casing completely winding the slag particle is not obtained, but instead a slag particle is obtained, whose surface is inertized by means of incorporation or filling of the pits or pores (24) of the grains (23) that form the granulated material (22) without incorporating each grain within a cement shell that winds it completely. This is advantageous because in the prior art techniques is not ensured that the binder re-acts with the surface of the granulated material, or slag from steelwork and the breakage of the cement shell involves the exposition of a non-inert slag surface. Instead with the inventive method the surface of the treated slag is essentially exposed in the end product but it has been made react with the binder and the other components of the mixture obtaining a surface that is inertized and does not furthermore react. This effect is obtained just thanks to the method claimed with the indicated sequence and times that allow to obtain the superficial reaction on the slag that allows their effective inertization.

Besides preventing the dispersion in the environment of heavy metal ions and other possible potentially polluting elements, the inventive solution also allows to obtain an inert product that has a better performance with respect to the products of prior art and which is more easily workable and treatable for obtaining the end product that can be different according to the specific application for which it will have to be used.

Furthermore the product obtained by means of the inventive method will not anymore be a potentially dangerous slag but will be catalogued as a utilizable secondary raw material, for example, to produce concrete suitable for all the uses, for asphalts, for bituminous conglomerates, for road sub-grades and pavements in general, and for other different industrial application fields as also wearing carpets, abrasive materials, etc.

The method according to the present invention is a preparation method of an inert product based on slags deriving from steel production processes in steelworks or ferrous mineral treatment processes in blast furnaces in which this method provides the following phases:

(a) grinding of the slag within grinding means (9,10) obtaining crushed slag in particulate form having crushed particle size between 0.1 and 4.0 mm or between 4.0 and 8.0 mm or between 8.0 mm and 12.0 mm or between 12.0 mm and 20.0 mm or between 20.0 mm and 30 mm, the preferred solution being the solution providing particles size ranges with sizes which are essentially included between 0.1 and 20.0 mm, even more preferably in the range between 0.1 and 12.0 mm;

(b) activating mixing means of a mixer (12);

(c) feeding a first water quantity within the mixer (12);

(d) waiting a first time T1 starting from the end of the feeding of this first water quantity;

(e) feeding within the mixer (12) of slag deriving from steel production processes in steelworks or ferrous mineral treatment processes in blast furnaces;

(f) waiting a second time T2 starting from the end of the feeding of the slag;

(g) feeding of hydraulic binder within the mixer (12);

(h) waiting of a third time T3 starting from the end of the feeding of the hydraulic binder;

(i) feeding a fluidifying additive within the mixer (12);

(k) waiting a fourth time T4 starting from the end of the feeding of the fluidifying additive;

(m) feeding a second water quantity within the mixer (12);

(n) waiting of a fifth time T5 from the end of the feeding of the second water quantity;

(o) extracting the mixed product and storing the mixed product for a sixth time T6 or maturation time within a storage tank (4), with possible continuous or periodic vibration;

(p) extracting the inert and matured product based on slag deriving from steel production processes in steelworks or ferrous mineral treatment processes in blast furnaces;

(q) possible grinding in fixed and/or movable crushing device to obtain a size preferably selected between end size in a range from 1.0 to 4.0 millimeters, size in a range from 4.0 to 8.0 millimeters, size in a range from 8.0 to 12.0, size in a range from 12.0 to 20.0 millimeters, size in a range from 20.0 to 30.0 millimeters in which are used grinding means preferably intended to obtain an end size corresponding to or greater than the size obtained following the grinding operated in the phase (a) so that the phase (q) is preferably a grinding phase intended to obtain a size of said inert and matured product essentially corresponding to or greater with respect to the size obtained following the phase (a) for grinding the slag within the grinding means (9,10);

(r) possible packaging or use of inert and matured product.

According to the desired quality degree, the grinding phase (a) can occur by means of two different grinding means (9,10) that will be preferably both present on the stabilization and inertization plant (14) of slag which is intended to obtain an inert and matured product based on slag deriving from steel production processes in steelworks or ferrous mineral treatment processes in blast furnaces and is made according to the present invention. In particular the plant (14) can comprise a hopper (1) containing the slag deriving from steel production processes in steelworks or ferrous mineral treatment processes in blast furnaces to be inertized to obtain the inert and matured product. The hopper (1) stores the slag on first transport means (13) intended to transport the slag alternatively towards a mill (10) or towards a crusher (9).

To obtain an inert and matured product based on slags having better quality there is provided the possibility to carry out the grinding by means of a mill (10), preferably by means of a ball mill or a rod mill with the aid of grinding additive that is added within the mill (10) from a first container (5) containing a grinding additive. As grinding additive is intended an additive, that can be in liquid and/or powder form, which has anti-static characteristics able to prevent the forming process of electrostatic charges between the grinding devices and the slags, thus preventing the formation of agglomerates around the grinding devices themselves with a consequent reduction of the effectiveness of the same grinding. The grinding additive quantities to be used must be proportioned to the electrostatic charges that are formed inside the mill. The grinding additives come out with the end product once completed the grinding cycle and are successively introduced again in the mill in correspondence with a following operation cycle. In particular the mills are machines equipped with a generally cylindrically shaped container that is put in rotation at high speed and inside which some grinding elements are stored, namely balls or rods, which exert a grinding action by effect of compressions, impacts, cuts and abrasions. The grinding product obtained with the mill (10) is sent towards a first container (2) of temporary deposit from which the crushed product can be taken according to the process needs to be sent towards the devices that are placed downstream of the first container (2) in the plant (14). The transport from the mill (10) to the first container (2) is made by means of second transport means (16) preferably in the form of conveyer belts, even more preferably in the form of conveyer belts closed by cases able to form a transport chamber insulated from the external environment to avoid dispersions in the environment.

To obtain an inert and matured product based on slags with lower production costs there is provided the possibility to carry out the grinding by means of a crusher (9), preferably a hammer crusher, namely crushers that crush the slags by means of repeated impacts that are obtained by means of flywheels rotating at high speed and equipped with protuberances suitable to bump the slags themselves for crushing them. The grinding product obtained with the crusher (9) is sent towards a second container (3) of temporary deposit from which the crushed product can be taken according to the process needs to be sent towards the devices that are placed downstream of the second container (3) in the plant (14). The transport from the crusher (9) to the second container (3) is made by means of third transport means (17) preferably in the form of conveyer belts, even more preferably in the form of conveyer belts closed by cases able to form a transport chamber insulated from the external environment to avoid dispersions in the environment.

The mixer (12) is preferably a planetary mixer, in which, namely mixing means rotate in an eccentric way preferably along the walls of a mixing chamber and simultaneously rotate on themselves around their own rotation axis.

The first water quantity and the second water quantity are added by means of a second container (6). The first water quantity is preferably between 50% and 85% of the total water quantity required in the process, even more preferably the first water quantity that is added to the starting of the inventive method is approximately equal to ⅔ of the total water quantity required in the process, corresponding to the sum of the first water quantity and second water quantity. The first and/or the second water quantity are preferably added by means of a nebulizer (15) intended to nebulize the water that is introduced within the mixer (12).

The water added in quantities between 50% and 85% of the required total water quantity is introduced in this proportion to try to obtain a saturate state with wet surface of the slag in the following introduction phase of the slag and during the mixing of the slag itself in the first production phases and also to facilitate the cohesiveness with the hydraulic binder at the time of the following introduction of the same. The introduction by means of nebulizer allows a greater diffusion on the whole internal surface of the mixer (12), while the time T1 acts to ensure that there is no more water flow in the mixer (12) during the introduction of the slag. Preferably the variations of water quantity made on the basis of the measuring carried out by the humidity sensor operate as corrective factor mainly or exclusively on the quantity of water that is introduced in the phase (m), leaving the amount of water introduced in the phase (c) unchanged.

The first time T1 that passes between the moment in which the feeding of the first water quantity within the mixer (12) is completed and the moment in which the feeding of the slag within the mixer (12) starts is preferably between 2 and 30 seconds, even more preferably between 5 and 15 seconds, the preferred value being of 10 seconds.

The feeding phase (e) within the mixer (12) of slag deriving from steel production processes in steelworks or ferrous mineral treatment processes in blast furnaces is a feeding phase of slag that has been preliminarily crushed according to the characteristics of grinding of phase (a), namely crushed slag in particulate having crushed particle size between 0.1 and 4 mm or between 4.0 and 8.0 mm or between 8.0 mm and 12.0 mm or between 12.0 mm and 20.0 mm or between 20.0 mm and 30 mm, the preferred solution being the one which provides grinding ranges with sizes essentially included between 0.1 and 20.0 mm, even more preferably between 0.1 and 12.0 mm. The feeding of the slag within the mixer (12) occurs by means of sixth transport means (20), preferably in the form of conveyer belts and even more preferably in the form of conveyer belts closed by cases able to form a transport chamber insulated from the external environment. The transport of the slag occurs by a weighing device (11) able to weigh the amount of slag that is introduced within the mixer (12). Within the weighing device can be introduced both the slag that by means of fourth transport means (18) originates from the first container (2) within which is the crushed slag by means of the mill (10) and the slag that by means of fifth transport means (19) originates from the second container (3) within which is the crushed slag by means of the crusher (9). For example one can provide matured inert end products obtained by means of feeding within the mixer (12):

only crushed slag from the first container (2) within which is the slag crushed by means of the mill (10);

only crushed slag from the second container (3) within which is the slag crushed by means of the crusher (9);

a first quantity of crushed slag coming from the first container (2) within which is the slag crushed by means of the mill (10) and a second quantity of crushed slag from the second container (3) within which is the slag crushed by means of the crusher (9).

The second time T2 that passes between the moment in which the feeding of the slag within the mixer (12) is completed and the moment in which the feeding of the hydraulic binder within the mixer (12) begins is preferably between 10 and 50 seconds, even more preferably between 20 and 40 second, the preferred value being of 30 seconds.

The time T2 is the time needed to allow the mixer (12) to mix the slag and the water inside the of it thus obtaining that the whole surface of the slag is sufficiently saturated obtaining a wet surface condition that helps a greater cohesiveness with the hydraulic binder. In fact having the right humidity quantities to reach a condition essentially corresponding to the wet surface condition of the slag is very important. In fact the hydraulic binder is, in general a compound or an ensemble of compounds with characteristics such to produce a cohesiveness between the elements in the presence of water and/or sufficient humidity to leave the cohesiveness process.

The feeding phase (g) within the mixer (12) of hydraulic binder is a feeding phase of a hydraulic binder coming from third container (7) placed near the mixer (12). Where as hydraulic binder is intended to indicate an inorganic component that, following the mixing with a set water quantity is subject to a hydrating process that causes some chemical reactions between the water and silicates, aluminates, calcium ferrites. The chemical reactions bring to the formation of insoluble or poorly soluble hydrates forming a dough that hardens after a hardening period. For example hydraulic binders suitable to use in the present invention are the gypsum, the lime, the hydraulic lime, the clinker, a clinker and gypsum mixture, the cement agglomerates and the cements. Preferably the hydraulic binder is selected from the group consisting of clinker, clinker and gypsum mixture, cement agglomerates, cements.

The third time T3 that passes between the moment in which the feeding of the hydraulic binder within the mixer (12) is completed and the moment in which the feeding of the fluidifying additive within the mixer (12) begins is preferably between 10 and 50 seconds, even more preferably between 20 and 40 seconds, the preferred value being of 30 seconds.

The time T3 is preferably in the range indicated to allow that the inlet phase of the hydraulic binder is completed at the time of the addition of the fluidifying additive in order to avoid the obstructing of the access ways due to the formation of agglomerates in the inlet points.

The feeding phase (i) within the mixer (12) of a fluidifying additive is a feeding phase of a super-fluidifying additive from a fourth container (8) placed near the mixer (12). As fluidifying additive is intended an additive that hinders the first formation of binding between the particles of the hydraulic binder itself but does not preclude their reaction and allows in this way the flowability of the mixture inside the mixer (12) and a sufficient coating of the slag by means of the binder dough. Preferably the amount of super-fluidifying additive occurs in the amount of about from 0.5 to 2% with respect to the weight of the hydraulic binder introduced within the mixer (12) at the phase (g).

The fourth time T4 that passes between the moment in which the feeding of the fluidifying additive within the mixer (12) is completed and the moment in which the feeding of the second water quantity within the mixer (12) begins is preferably between 5 and 50 seconds, even more preferably between 10 and 30 seconds, the preferred value being of 20 seconds.

The time T4 is necessary to give to mixer (12), which always continues to turn with water, slag, hydraulic binder, additive, the sufficient time to mix all the ingredients in an optimal way, the introduction of the second water quantity is always related to the fact that the mixture that can be obtained has a consistence so as to ensure a sufficient cover of the whole surface of the slag by the binder, for example in a similar way to an Abrams Si cone-shaped damp soil layer.

The fifth time T5 that passes between the moment in which the feeding of the second water quantity within the mixer (12) is completed and the moment in which the extraction of the product begins is a time in which the end mixing of all the elements added within the mixer (12) occurs, the fifth time T5 being preferably between 2 and 10 minutes, even more preferably between 3 and 5 minutes. The transport of the product mixed by the mixer (12) towards the storage tank within which occurs the maturation can occur by means of seventh transport means (21), preferably in the form of conveyer belts, even more preferably conveyer belts closed in sealing cases able to preclude the dispersion of the material transported in the external environment.

The time T5 is necessary to ensure the uniformity in the amalgamated product obtained with the mixing of the different components by means of the mixer (12).

The sixth time T6 or maturation time, which occurs within a storage tank (4), is preferably between 12 and 36 hours, even more preferably between 18 and 30 hours, the preferred maturation time being approximately of 24 hours.

The time T6 is necessary to ensure that the formation of the binding between the slag and the hydraulic binder on the surface of the slag itself in order to have encapsulated all the components and closed all the interstices, the pores and the pits has occurred.

Once the maturation time has elapsed, from the storage tank (4) can be extracted the product in the form of inert and matured product based on slag which can be immediately used to be mixed with other components in function of the provided end use or can be packaged to be used in a second time or to be sent to the place where it will be actually used to be mixed with other components in function of the provided end use.

The maturation phase (o) can also provide phases of possible continuous or periodic vibration of the product to hinder or reduce the formation of agglomerates. The storage tank (4), therefore, can be endowed with vibrating means able to induce a continuous or periodic vibration of the product contained in the same.

The grinding phase (q) in fixed and/or movable crusher can be present or can be absent according to the product that can be obtained after the maturation operated in the phase (o). In fact following the maturation some agglomerates of grains having very greater sizes with respect to the sizes of the grains that have been obtained following the grinding operated in the phase (a) could be formed. The grinding phase (q) has just the purpose to break such agglomerates in order to ensure that the matured end product has a sufficiently uniform size and essentially corresponding to the size that has been obtained following the grinding operated in the phase (a). For example one can have a grinding operated in the phase (a) to obtain a size between 1.0 to 4.0 millimeters and, following the finding of an excessive presence of agglomerates after the maturation phase (o), one can operate a grinding phase (q) to re-obtain a uniform size of the matured end product between 1.0 to 4.0 millimeters. For example one can have a grinding operated in the phase (a) to obtain a size between 4.0 to 8.0 millimeters and, following the finding of an excessive presence of agglomerates after the maturation phase (o), one can operate an end grinding phase (q) to re-obtain an uniform size of the matured end product between 4.0 to 8.0 millimeters. In this case it is preferable not to operate a grinding phase (q) so as to obtain a lower size with respect to the size obtained following the starting grinding phase (a), because by this grinding one would break the previously obtained and inertized grains following the inventive process, frustrating or reducing their beneficial effects. It is possible, instead, to operate a grinding phase (q) so as to obtain a greater size with respect to the size obtained following the starting grinding phase (a), because the purpose of this phase is only that to break the possible aggregates with larger dimensions. One can therefore have, for example, a grinding operated in the phase (a) to obtain a size between 4.0 to 8.0 millimeters and a successive end grinding phase (q) operated with suitable grinding means to obtain a size between 8.0 to 12.0 millimeters or other size of larger dimensions. The same reasoning extends also to the other quoted sizes and therefore one can operate a grinding phase (a) between 8.0 to 12.0 millimeters associated to a grinding phase (q) between 8.0 to 12.0 millimeters or between 12.0 and 20.0 mm. The final aim, therefore, is to arrive to a matured and inertized end product composed of individually inertized grains of essentially uniform size in which each grain is essentially coated by the binder that also operates the filling of the pits or pores present on the single grains of the matured end granular product. In general is preferable that the matured and inertized end product has grains of uniform sizes, so that is preferable to operate the inventive method separately according to the end granulometry that one wishes to obtain, avoiding the mixing of grains of sizes very different from one another. In general the inertization will be most effective with particles of smaller sizes and in that case also greater binder quantities will be necessary because there is a greater surface to be inertized due to the smaller sizes of the particles to be treated.

Regarding the quantities provided for the different components that are mixed within the mixer (12), making for example reference to a mixer (12) endowed with a mixing chamber having a volume of 1 cubic meter, the components are introduced in the following quantities:

- water added within the mixing chamber at the phase (c) equal to a first quantity preferably between about 12 and 35 liters;
- slags added within the mixing chamber at the phase (e) equal to a quantity preferably between about 1800 and 2600 kilograms;
- hydraulic binder added within the mixing chamber at the phase (g) equal to a quantity preferably between about 80 and 240 kilograms;
- fluidifying additive added within the mixing chamber at the phase (i) equal to a quantity preferably corresponding to about from 0.5 to 2% in weight with respect to the hydraulic binder weight, i. e. preferably a fluidifying additive quantity between about 0.4 and 4.8 kilograms or equivalent quantity expressed in liters;
- water added within the mixing chamber at the phase (m) equal to a second quantity preferably between about 8 and 15 liters.

In general the total water quantity that is introduced within the mixing chamber in the phases (c) and (m) is a total water quantity between 20 and 50 liters, in which the phase (c) is a phase of addition of a first water quantity between 50% and 85% of the total water quantity required in the process, even more preferably the first water quantity that is added in the phase (c) being approximately equal to ⅔ of the total water quantity required in the process. In general the water quantity may change according to the humidity present in the slag to be treated, so that slag introduced in the plant which is a slag with high moisture content will require a treatment with a less water quantity to be fed relative to the phases (c) and (m). Likewise slag introduced in the plant that is essentially dry slag will require a treatment with a larger quantity of water to be fed relative to the phases (c) and (m). It is provided that the plant is endowed with a humidity sensor (26) of the slag introduced in the same, for example placed near the hopper (1). the amount of water to be fed in the phases (c) and (m) is adjusted according to the measuring of humidity of the slag to be fed within the hopper. The measuring is made by means of said humidity sensor (26). Obviously one can also provide other installation positions of the humidity sensor (26), namely at the containers (2,3) of the crushed slag or in the weighing device (11), such solutions being advantageous in the case in which the phases of mixing with the binder occur a long time after with respect to the starting grinding phases (a).

In general, therefore the method according to the present invention can provide a measuring phase of the slag humidity. This measuring of the slag humidity is suitable for the adjustment of the water quantity introduced in the phase (c) or in the phase (m) or in both phases (c) and (m). In the case in which, following the measuring, one detects in the slag an amount of humidity greater with respect to the condition of absence of humidity, then an adjusting phase of the water quantity that is introduced in the inventive process is provided. Seen that the amount of water indicated in this description is the amount of water optimal for the case in which the slag is completely dry, then the adjusting phase of the water amount to be introduced will be a phase of reduction of the water amount that is provided with respect to the optimal case of a completely dry slag. In general the reduction of the water amount to be introduced is directly proportional with respect to the measured humidity quantity, so that greater is the amount of humidity measured in the slag, greater is the reduction of water amount to be introduced in the phases (c) and (m) of the inventive process.

In general it is provided that greater binder quantities are necessary in the case of process applied to sizes obtained following a grinding phase (a) suitable to obtain lower sizes because a greater surface to be inertized is present due to the lower sizes of the particles to be treated.

Example 1

The grinding of a slag deriving from steel production processes in steelworks or ferrous mineral treatment processes in blast furnaces is carried out in quantity equal to about 2200 kilograms within a ball grinding mill (10) with obtainment of crushed slag in particulate having crushed particles size between 0.1 and 4 mm. Successively the mixing means of a planetary mixer (12) are activated and within the mixing chamber of the planetary mixer (12) a first water quantity equal to about 20 liters is added. After a first time T1 of about 10 seconds the introduction of the crushed slag in quantity of about 2200 kilograms within the mixing chamber of the planetary mixer (12), maintaining activated the mixing means is carried out. After second time T2 of about 30 seconds the introduction of the hydraulic binder in quantity of about 150 kilograms within the mixing chamber of the planetary mixer (12), maintaining activated the mixing means is carried out. After a third time T3 of about 30 seconds the introduction of the fluidifying additive in quantity of about 1.5 liters or equivalent quantity expressed in kilograms within the mixing chamber of the planetary mixer (12) is made, maintaining activated the mixing means. After a fourth time T4 of about 30 seconds the introduction of a second water quantity in quantity of about 10 liters within the mixing chamber of the planetary mixer (12) is made, maintaining activated the mixing means. Maintenance of mixing means in activated state for a fifth time T5 from the end of the feeding of the second water quantity, the fifth time T5 being of about 4 minutes. Extraction of the mixed product and storing of the mixed product for a sixth time T6 or maturation time within a storage tank (4), the sixth time T6 being of about 24 hours.

Example 2

The grinding of slag deriving from steel production processes in steelworks or ferrous mineral treatment processes in blast furnaces is made in quantity equal to about 1800 kilograms within a hammer crusher (9) with crushed slag obtainment in particulate having crushed particles size between 0.1 and 4 mm. Successively the mixing means of a planetary mixer (12) are activated and within the mixing chamber of the planetary mixer (12) a first water quantity equal to about 12 liters is added. After a first time T1 of about 5 seconds the introduction of the crushed slag is made in quantity of about 1800 kilograms within the mixing chamber of the planetary mixer (12), maintaining activated the mixing means. After second time T2 of about 20 seconds the introduction of the hydraulic binder in quantity of about 80 kilograms within the mixing chamber of the planetary mixer (12) is made, maintaining the mixing means activated. After a third time T3 of about 20 seconds the introduction of the fluidifying additive in a quantity of about 0.5 kilograms within the mixing chamber of the planetary mixer (12) is made, maintaining the mixing means activated. After a fourth time T4 of about 20 seconds the introduction of a second water quantity in a quantity of about 6 liters within the mixing chamber of the planetary mixer (12) is made, maintaining activated the mixing means. Maintenance in activated state of mixing means for a fifth time T5 from the end of the feeding of the second water quantity, the fifth time T5 being of about 3 minutes. Extraction of the mixed product and storing of the mixed product for a sixth time T6 or maturation time within a storage tank (4), the sixth time T6 being of about 20 hours.

Example 3

The grinding of slag deriving from steel production processes in steelworks or ferrous mineral treatment processes in blast furnaces in a quantity equal to about 1300 kilograms is made within a hammer crusher (9) with obtainment of crushed slag in particulate having crushed particles size between 0.1 and 4 mm and the grinding of slag deriving from steel production processes in steelworks or ferrous mineral treatment processes in blast furnaces is made in quantity equal to about 1300 kilograms within a ball grinding mill (10) with obtainment of crushed slag in particulate having crushed particles size between 0.1 and 4 mm. Successively the mixing means of a planetary mixer (12) are activated and within the mixing chamber of the planetary mixer (12) a first water quantity equal to about 26 liters is added. After a first time T1 of about 15 seconds the introduction of the crushed slag in a quantity of about 2600 kilograms within the mixing chamber of the planetary mixer (12), maintaining activated the mixing means is made. In this example within the mixing chamber of the planetary mixer (12) about 1300 crushed slag kilograms by means of the crusher hammer (9) and about 1300 crushed slag kilograms by means of the ball grinding mill (10) have been introduced. After second time T2 of about 40 seconds the introduction of the hydraulic binder in a quantity of about 240 kilograms within the mixing chamber of the planetary mixer (12), maintaining activated the mixing means is made. After a third time T3 of about 40 seconds the introduction of the fluidifying additive in a quantity of about 4.8 kilograms within the mixing chamber of the planetary mixer (12), maintaining activated the mixing means is made. After a fourth time T4 of about 30 seconds the introduction of a second water quantity in a quantity of about 14 liters within the mixing chamber of the planetary mixer (12), maintaining activated the mixing means is made. Maintenance in activated state of mixing means for a fifth time T5 from the end of the feeding of the second water quantity, the fifth time T5 being of about 10 minutes. Extraction and storing of the mixed product for a sixth time T6 or maturation time within a storage tank (4), the sixth time T6 being of about 30 hours.

In general the product made according to the described method, provides the addition in different phases of the following components:
- A) Slags deriving from steel production processes in steelworks or ferrous mineral treatment processes in blast furnaces in quantity from 80 to 95% with respect to the total weight of components introduced within said mixer (12);
- B) Hydraulic binder in a quantity from 3 to 12% preferably in a quantity from 4 to 9% with respect to the total weight of components introduced within said mixer (12);
- C) A total water quantity, corresponding to the sum of said first water quantity and said second water quantity, in which the amount of total water is between 0.5 and 3%, preferably between 0.99 and 1.7% with respect to the total weight of components introduced within said mixer (12);
- D) Fluidifying agent in a quantity from 0.01 to 0.2% with respect to the total weight of components introduced within said mixer (12).

The slags are taken from the suitable storage sites or directly sent from the production site of the same towards retaining structures or directly towards the hopper (1) of the plant (14) of treatment and inertization of the slags made according to the present invention. The retaining structures and the hopper (1) are closed structures in which the dispersion of heavy metals is avoided and in which the contact with the external environment is avoided. The hopper (1) is equipped with a weighing device preferably in the form of a weighing-machine with multiple cells and discharges set quantities of slags weighed by the weighing-machine on first transport means (13) that transport the slags to be treated and inertized towards the grinding means (9,10), which, as previously explained can be made in form of a crusher (9) namely a hammer crusher or can be made in form of a mill (9) namely a ball or rod grinding mill with the possible addition of grinding additive from a first container (5).

The transport means (13, 16, 17, 18, 19, 20, 21) are preferably conveyer belts, even more preferably conveyer belts closed in sealing cases intended to preclude the dispersion of the transported material in the external environment.

In general the stabilization and inertization method of slag able to obtain the inert and matured product based on slag provides the use of at least one portion of slags which are slags deriving from steel production processes in steelworks and/or provides the use of at least one portion of slags which are slags deriving from ferrous minerals treatment processes in blast furnaces.

In general the present invention also relates to a stabilization and inertization plant (14) of slag which is intended to obtain an inert and matured product based on slag deriving from steel production processes in steelworks or ferrous mineral treatment processes in blast furnaces by means of mixing operated within a mixer (12) in which the plant operates with the stabilization and inertization method of slag previously described. The plant can comprise:
- at least one mill (10), preferably a ball mill or a rod mill intended to operate said grinding of the slag obtaining crushed slag in particulate having crushed particles size between 0.1 and 4 mm or between 4.0 and 8.0 mm or between 8.0 mm and 12.0 mm or between 12.0 mm and 20.0 mm or between 20.0 mm and 30 mm, the preferred solution being the solution that provides grinding ranges with sizes essentially included between 0.1 and 20.0 mm, even more preferably between 0.1 and 12.0 mm;
- at least one crusher (9), preferably a hammer crusher intended to operate said grinding of said slag obtaining crushed slag in particulate having crushed particles size between 0.1 and 4 mm or between 4.0 and 8.0 mm or between 8.0 mm and 12.0 mm or between 12.0 mm and 20.0 mm or between 20.0 mm and 30 mm, the preferred solution being the solution that provides grinding ranges with sizes essentially included between 0.1 and 20.0 mm, even more preferably between 0.1 and 12.0 mm.

The plant (14) will include a hopper (1) containing the slag deriving from steel production processes in steelworks or ferrous mineral treatment processes in blast furnaces which must be inertized to obtain the matured and inert product. The hopper (1) deposits the slag on the first transport means (13) which are intended to transport the slag alternatively towards the mill (10) or towards the crusher (9). In correspondence with an exit duct of the mill (10) there are second transport means (16) intended to transport the crushed slag by means of this mill (10) towards a first container (2). Likewise in correspondence with an exit duct of the crusher (9) there are third transport means (17) intended to transport the crushed slag by means of this crusher (9) towards a second container (3). The introduction of the crushed slag within the mixer (12) occurs from the first container (2) by means of fourth transport means (18) or from the second container (3) by means of fifth transport means (19) or simultaneously from the first container (2) and from the second container (3) according to set feeding ratios of crushed slag quantity fed from the first container (2) with respect to the crushed slag quantities fed from the second container (3).

As previously explained the plant includes a weighing device (11), the introduction of the crushed slag within the mixer (12) occurring from the first container (2) or from the second container (3) with interposition of this weighing device (11), the charging within the mixer (12) of a quantity of crushed slag weighed by means of the weighing device (11) happening by means of seventh transport means (21) able to transport this quantity of crushed slag weighed by the weighing device (11) to the mixer (12).

In the inventive plant (14) the mixer (12) is preferably a planetary mixer.

Preferably the plant (14) for stabilization and inertization of slag comprises at least one humidity sensor (26) able to measure the humidity of the slag. The measuring of the humidity of the slag is suitable for the adjustment of the water quantity introduced in the phase (c) or in the phase (m) or in both phases (c) and (m). Following the measuring of a quantity of humidity greater with respect to the condition of absence of humidity, elaboration means (27) calculate at least one water feeding corrective coefficient in which this corrective coefficient is suitable to reduce the amount of water to be fed proportionally with respect to the measured humidity quantity. The elaboration means (27) will control preferably also the quantities of fed materials, for example by means of weighing devices, liter counters, etc. The elaboration means (27) will control preferably also the time of duration of the various phases, the activation of the grinding means, the activation of the transport means, the time of maturation, etc. In this way obtaining a process with high automation degrees can also be provided.

The present invention also relates to an inert and matured product based on slag deriving from steel production processes in steelworks or ferrous mineral treatment processes in blast furnaces in which this matured and inert product is obtained by means of maturation of a mixture within a mixer (12), this mixture comprising:
(1) the crushed slag within grinding means (9,10) in particulate having crushed particles size between 0.1 and 4 mm or between 4.0 and 8.0 mm or between 8.0 mm and 12.0 mm or between 12.0 mm and 20.0 mm or between 20.0 mm and 30 mm, the preferred solution being the one that provides ranges of particle size with sizes essentially included between 0.1 and 20.0 mm, even more preferably between 0.1 and 12.0 mm;
(2) water;
(3) hydraulic binder;
(4) fluidifying additive.

The inert and matured product based on slag deriving from steel production processes in steelworks or ferrous mineral treatment processes in blast furnaces can be obtained by the mixing of:
- a quantity of total water between 0.5 and 3%, preferably between 0.99 and 1.7% with respect to the total weight of components introduced within the mixer (12);
- slags deriving from steel production processes in steelworks or ferrous mineral treatment processes in blast furnaces in a quantity from 80 to 95% with respect to the total weight of components introduced within the mixer (12);
- hydraulic binder in a quantity from 3 to 12% preferably in quantity from 4 to 9% with respect to the total weight of components introduced within the mixer (12);
- fluidifying agent in a quantity from 0.01 to 0.2% with respect to the total weight of components introduced within the mixer (12).

The inert and matured product based on slag deriving from steel production processes in steelworks or ferrous mineral treatment processes in blast furnaces can be obtained by the mixing of:
- first water quantity added within the mixer (12) between about 12 and 35 liters;
- slags added within the mixer (12) equal to a quantity between about 1800 and 2600 kilograms;
- hydraulic binder added within the mixer (12) equal to a quantity between about 80 and 240 kilograms;
- fluidifying additive added within the mixer (12) equal to a quantity corresponding to about from 0.5 to 2% in weight with respect to the hydraulic binder weight, namely a fluidifying additive quantity between about 0.4 and 4.8 kilograms;
- water added within the mixer (12) equal to a second quantity between about 8 and 15 liters.

The inert and matured product based on slag deriving from steel production processes in steelworks or ferrous mineral treatment processes in blast furnaces according to the present invention can be obtained by means of the previously described production method.

Furthermore, thanks to the known characteristic of resistance to the high temperatures of the slags also realization tests of samples of peri-refractory and refractory materials using the slags treated according to the inventive method have been carried out, opening the possibility to the use of the slags treated with the inventive method also for the realization of peri-refractory and refractory concretes.

Advantageously the obtained inert product can be easily utilizable for multiple applications among which, without limitation for the purposes of the present invention, use in building field for the realization of concretes, use as abrasive material, use for the realization of road subgrades, use for the realization of pavements in general.

Tests with a hydraulic binder in the form of mixture of hydraulic binders of mineral type have also been carried out, for example comprising Portland or pozzolana cement and aluminous cement or sulpho aluminous cement. This combination has evidenced a further considerable reduction of the processing times besides an improvement of the yield of the product. In practice using as a hydraulic binder only one traditional cement, for example of Portland or pozzolana type, as reference sample according to the quantities previously indicated, the progressive replacement of a part of the quantities indicated for the cement with raising quantity of aluminous or sulpho aluminous cement involves a corresponding progressive reduction of the process times. This aspect is advantageous by the point of view of the process treatment times, but on the contrary involves a higher cost of the end product given by the greater cost of the aluminous or sulpho aluminous cement with respect for example to the traditional cement. Consequently the solution according to the present invention is advantageously applicable also with mixtures of hydraulic binders of different type, namely a mixture of Portland cement or pozzolanic and aluminous cement, a mixture of Portland cement or pozzolanic and sulpho aluminous cement, a mixture of Portland cement or pozzolanic and aluminous cement and sulpho aluminous cement.

Experimental First Example

In a first test a first sample of non-treated slag and a second sample of slag treated according to the inventive methodology, by using hydraulic binder in the form of cement of the type known as CEM the 52.5 have been compared.

The results are reported in the following table 1.

TABLE 1

| Pressure [psia] | % of Mercury intrusion in the non-treated slag | % of Mercury intrusion in the slag treated with the inventive method |
| --- | --- | --- |
| 0.57 | 0 | 0 |
| 1.43 | 6.11 | 4.03 |
| 3.72 | 12.75 | 6.28 |
| 6.11 | 14.10 | 7.99 |
| 12.07 | 17.44 | 9.57 |
| 14.04 | 18.30 | 10.02 |
| 30 | 34.32 | 18.95 |
| 39.96 | 43.37 | 28.65 |
| 108.5 | 50.52 | 38.33 |
| 134 | 52.94 | 43.24 |
| 167.5 | 54.99 | 49.73 |

The comparison has been performed for the purpose of verifying the reduction of porosity obtained with the inventive methodology. In particular resort has been made to the measuring technique of the porosity known with the name of mercury intrusion porosimetry in which mercury is intruded in the slag in condition of high pressure measuring the amount of mercury that actually penetrates in the slag itself.

From the table 1 is evident the reduction of the porosity of the slag treated with the inventive method with respect to the non-treated slag, evidencing the coating action of the pores that can be obtained with the inventive method.

Experimentally, applying the law of Washburn, it is observed that the diameter of the pores of the treated slag according to the inventive methodology is reduced to about 0.6 micrometers for pressure values of about 320 psia, i. e. the pores with greater diameter than that indicated have been occluded by the applied treatment.

Also measurements of the porosity by means of a helium pycnometer, whose results are reported in table 2. have been performed.

TABLE 2

| | non-treated raw slag | raw slag treated with the inventive method | non-treated fine slag | fine slag treated with the inventive method |
| --- | --- | --- | --- | --- |
| Density [g/cm3] | 3.55 | 3.49 | 3.44 | 3.33 |
| Porosity [%] | 5.3 | 1.7 | 8.4 | Value lower than the instrumentally measurable value |

Also a different measuring methodology confirms the considerable reduction of the porosity in the slag treated with the inventive method until reaching, in the case of fine slag treated with the inventive method, values which are not instrumentally measurable by using the measuring methodology indicated.

Also in the analysis made by the electronic microscope it is evident the obtainment of an occlusion effect of the pores without total incorporation of the slag, as the material added in the mixing occludes the pores of the slag.

The experimental results have confirmed the functionality of the inventive method and its improved effectiveness with respect to the prior art techniques.

Further tests have been carried out with different hydraulic binding namely gypsum, lime, hydraulic lime, clinker, clinker and chalk mixture, cement agglomerates, Portland cements, pozzolanic cements, calcium aluminates both amorphous and crystalline, sulpho aluminates. Also mixtures of the previously listed inorganic components can be possibly used.

Furthermore tests have been carried out in which the hydraulic binder added in the mixer has been added in the form of mixture of hydraulic binders of different type or in the form of mixture of more hydraulic binders of mineral type, namely a mixture of Portland cement and/or pozzolanic and aluminous cement, a mixture of Portland cement and/or pozzolanic and sulpho aluminous cement, a mixture of Portland cement and/or pozzolanic and aluminous cement and/or sulpho aluminous cement. In this case the addition of the mixture of hydraulic binders has been carried out with values included between 40 and 80 kilograms, obtaining good results that confirm the possibility of resort to reduced binder quantity to obtain the desired inertization of the slags that makes them suitable for the previously indicated uses. Therefore the use of a binder quantity included between 40 and 240 kilograms is provided.

Further tests carried out in relation to the addition phase of the second water quantity have evidenced the obtainment of good results when the quantity of the second added water quantity is such as to ensure the correct and homogenous covering of the surface of the slags by means of the covering mixture based on hydraulic binder, obtaining total values for the total water quantity that is introduced within the mixing chamber in the phases (c) and (m) that can be between 20 and 100 liters.

Nomenclature Used

With reference to the identification numbers reported in the enclosed figures, the following nomenclature has been used:
1. Hopper
2. First container
3. Second container
4. Storage tank
5. First vessel
6. Second vessel
7. Third vessel
8. Fourth vessel
9. Crusher
10. Mill 11. Weighing device
12. Mixer
13. First transport means
14. Plant
15. Nebulizer
16. Second transport means
17. Third transport means
18. Fourth transport means
19. Fifth transport means
20. Sixth transport means
21. Seventh transport means
22. Granulated material
23. Grain
24. Pit or pore
25. Binder
26. Humidity sensor
27. Elaboration means

The invention claimed is:
1. A method of stabilizing and inertizing slag so as to obtain an inert and matured product from slag deriving from steel production processes in steelworks and ferrous mineral treatment processes in blast furnaces, the method comprising:
grinding the slag within a grinder to obtain crushed slag in particulate form having a crushed particle size between 0.1 and 4 millimeters or between 4.0 and 8.0 millimeters or between 8.0 and 12.0 millimeters or between 12.0 and 20.0 millimeters or between 20.0 and 30.0 millimeters;
activating a mixer;
feeding a first water quantity to the mixer;
waiting for a first time starting from an end of the feeding of the first water quantity;
feeding the crushed slag into the mixer;
waiting a second time starting from an end of the step of feeding the slag to the mixer;
feeding a hydraulic binder to the mixer;
waiting a third time from an end of the step of feeding of the hydraulic binder;
feeding a fluidifying additive to the mixer;
waiting a fourth time starting from an end of the step of feeding of the fluidifying additive;
feeding a second water quantity to the mixer;
waiting a fifth time from an end of the step of feeding of the second water quantity;
extracting a mixed product from the mixer and storing the mixed product for a sixth time within a storage tank;
extracting the inert and matured product from the storage tank; and
grinding the inert and matured product in a crushing device to obtain a specific size of the inert and matured product such that the inert and matured product has a size that is equal to or greater than the size obtained following the step of grinding of the slag within the grinder, the total water quantity corresponding to a sum of the first water quantity and the second water quantity being between 0.5 and 3% by weight of the total weight of the components introduced to the mixer, the slag being in a quantity of between 80% and 95% by percent by weight with respect to the total weight of the components introduced to the mixer, the hydraulic binder being between 3 to 12% by weight of the total components introduced to the mixer, the fluidifying agent being between 0.1 and 0.2% by weight with respect to the total weight of the components introduced to the mixer.

2. The method of claim 1, further comprising:
packaging the inert and matured product.
3. The method of claim 1, the step of feeding the first water quantity comprising:
feeding the first water quantity which is between 50% and 85% of the total water quantity corresponding to the sum of the first water quantity and the second water quantity.
4. The method of claim 1, wherein one of the steps of feeding the first water quantity and the second water quantity being nebulized by a nebulizer so as to nebulize the water within the mixer.
5. The method of claim 1, the first time between the end of the step of feeding the first water quantity and the start of the step of feeding the crushed slagged within the mixer being between 2 and 30 seconds, the second time between the end of the step of feeding the crushed slag and the start of the step of feeding the hydraulic binder is between 10 and 50 seconds, the third time between the end of the step of feeding the hydraulic binder and a start of the step of feeding the fluidifying additive is between 10 and 50 seconds, the fourth time between the end of the step of feeding the fluidifying additive and the start of the step of the feeding of the second quantity water quantity is between 5 and 50 seconds, the fifth time between the end of the step of feeding the second water quantity and the start of the step of extraction is between 2 and 10 minutes, the sixth time relative to the step of maturing the mixed product is between 12 and 36 hours.
6. The method of claim 1, the first water quantity fed to the mixer is equal to a quantity of between 12 and 35 liters, the slag fed to the mixer being between 1800 and 2600 kg, the fluidifying additive fed to the mixer being between 0.5 and 2% by weight of the hydraulic binder, the second water quantity fed to the mixer is equal to a quantity of between 8 and 15 liters.
7. The method of claim 1, the hydraulic binder fed to the mixer being between 40 and 240 kilograms.
8. The method of claim 7, the hydraulic binder fed to the mixer being between 80 and 240 kilograms.
9. The method of claim 1, the hydraulic binder being selected from the group consisting of gypsum, lime, hydraulic lime, clinker, a mixture of clinker and gypsum, cement agglomerates, and cement.
10. The method of claim 1, the hydraulic binder selected from the group consisting of hydraulic binder in the form of a mixture of one or more hydraulic binders of a mineral type, hydraulic binders in the form of a mixture of one or more hydraulic binders including Portland cement and pozzolanic and aluminous cement, hydraulic binders in the form of a mixture of hydraulic binders having to Portland cement and pozzolanic and sulpho aluminous cement, hydraulic binders in the form of a mixture of hydraulic binders having Portland cement and pozzolanic and alumina cement with sulpho aluminous cement.
11. The method of claim 1, further comprising:
obtaining at least a portion of the slag from slags derived from steel production processes in steelworks.
12. The method of claim 1, further comprising:
obtaining at least a portion of the slag from slags derived from ferrous mineral treatment process is in blast furnaces.
13. The method of claim 1 further comprising:
measuring a humidity of the slag; and
adjusting the first water quantity or the second water quantity or both based upon the humidity of the slag.
14. A plant for the stabilization and inertization of slag so as to obtain an inert and matured product based on slag derived from steel production processes in steelworks or ferrous mineral treatment processes in blast furnaces, the plant comprising:

a mixer;

at least one mill adapted to grind the slag so as to obtain crushed slag in particulate form having crushed particle sizes of between 0.1 and 4.0 millimeters or between 4.0 and 8.0 millimeters or between 8.0 and 12.0 millimeters or between 12.0 and 20.0 millimeters or between 20.0 and 30.0 millimeters;

at least one crusher adapted to obtain a crushed slag;

a hopper containing the slag;

a first transport device cooperative with the hopper so as to receive the slag from the hopper, the first transport device transporting the slag toward the mill or toward said crusher in correspondence with an exit duct of the mill;

a second transport device adapted to transport the crushed slagged from the mill toward a first container relative to an exit duct of the crusher;

a third transport device adapted to transport the crushed slag from the crusher toward a second container;

a fourth transport device adapted to introduce the crushed slag to the mixture from the first container;

a fifth transport device cooperative with the second container so as to transport the crushed slag from the second container to the mixer, the fourth and fifth transport devices transporting the crushed slag at set feeding ratios;

a weighing device cooperative with the fourth and fifth transport devices so as to weigh the crushed slag as passed to said mixer from said first container and from said second container;

a seventh transport device cooperative with the weighing device so as to transport the weighed crushed slag from the weighing device to the mixer;

at least one humidity sensor adapted to measure a humidity of the slag; and a water delivery device for passing water to said mixer in a first water quantity and a second water quantity, the relationship of the first water quantity and the second water quantity being adjusted relative to the humidity as sensed by said at least one humidity sensor.

* * * * *